UNITED STATES PATENT OFFICE.

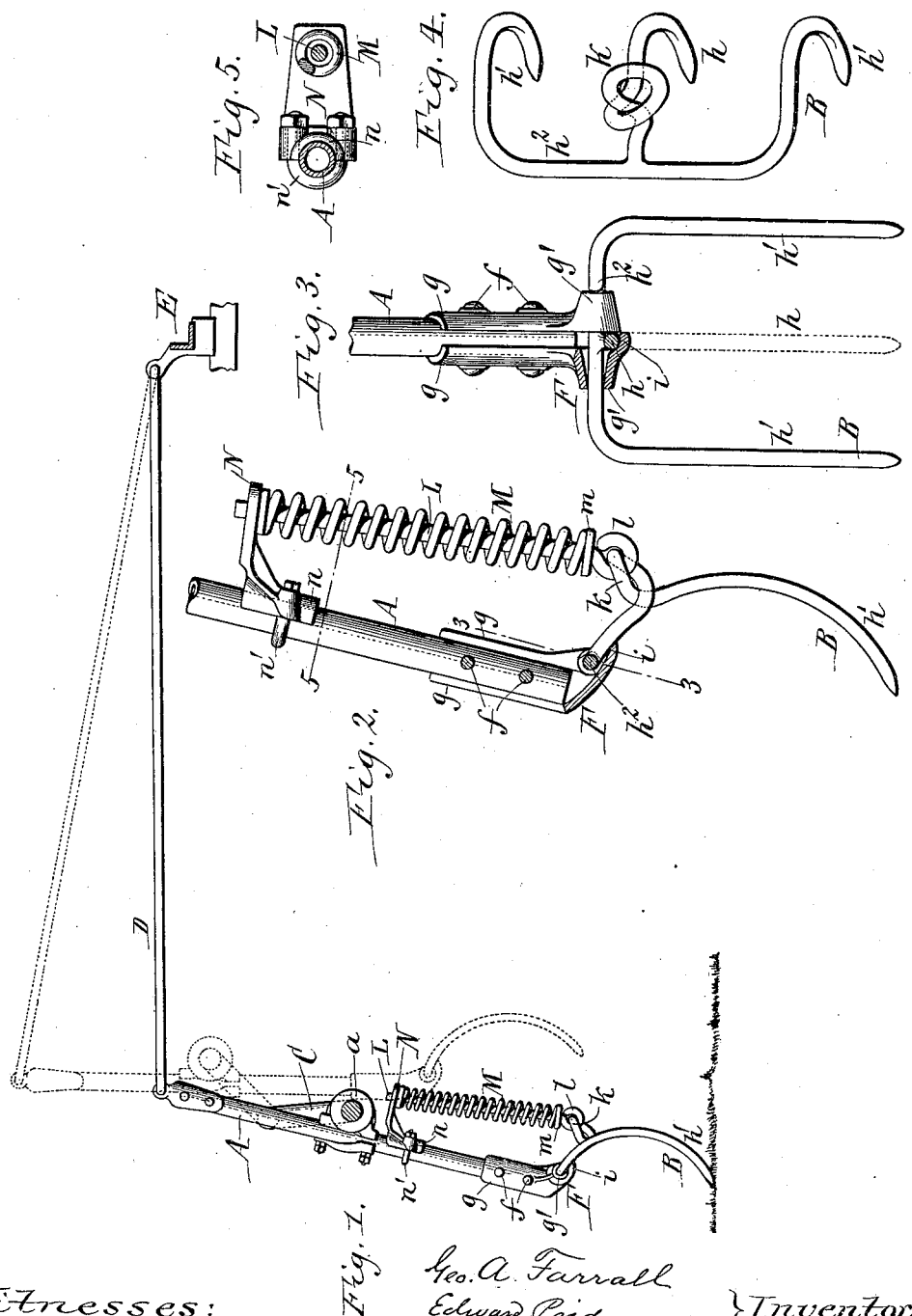

GEORGE ALBERT FARRALL AND EDWARD PRIDMORE, OF BATAVIA, NEW YORK, ASSIGNORS TO THE JOHNSTON HARVESTER COMPANY, OF SAME PLACE.

HAY-TEDDER.

SPECIFICATION forming part of Letters Patent No. 648,148, dated April 24, 1900.

Application filed April 10, 1899. Serial No. 712,376. (No model.)

*To all whom it may concern:*

Be it known that we, GEORGE ALBERT FARRALL and EDWARD PRIDMORE, citizens of the United States, residing at Batavia, in the county of Genesee and State of New York, have invented new and useful Improvements in Hay-Tedders, of which the following is a specification.

This invention relates to that class of hay-tedder forks which are pivoted to the lower ends of the fork-arms in such manner that they can swing or fold forwardly or toward the front of the machine upon striking an obstruction and which are held yieldingly in their operative position by a spring.

The object of this invention is to improve the construction of the fork and its righting-spring, with a view of simplifying the construction of the parts and rendering them more efficient and convenient in operation.

In the accompanying drawings, Figure 1 is a longitudinal sectional elevation of a tedder-fork and connecting parts provided with our improvements. Fig. 2 is a longitudinal sectional elevation of the lower portion of the fork-arm, the fork, and the righting-spring on an enlarged scale. Fig. 3 is a front elevation of these parts, the middle tine of the fork being cut away in line 3 3, Fig. 2. Fig. 4 is a perspective view of the fork viewed from above. Fig. 5 is a horizontal section in line 5 5, Fig. 2, looking upward.

Like letters of reference refer to like parts in the several figures.

A represents the upright fork-arm; B, the fork arranged at the lower end thereof; C, the crank of the shaft by which the fork-arm is actuated, and D the longitudinal guide-link extending from the upper end of the fork-arm forwardly to the frame E of the machine.

The fork-arm A may be of any suitable construction and is preferably a tubular bar and provided about midway of its length with a bearing $a$, by which it is connected with the crank C. The lower end of the arm A is provided with a divided fork-bearing F, composed of two halves, which are secured to opposite sides of the fork-arm by transverse rivets $f$. Each of these halves consists of an upright half-sleeve or concave clamping-plate $g$, which embraces one side of the fork-arm and through which the fastening-rivets $f$ pass, and a horizontal bearing-sleeve $g'$, which projects laterally from the lower end of the half-sleeve. The two bearing-sleeves are arranged in line with each other below the lower end of the fork-arm and in front of the same. The fork has three tines $h\ h'$—a middle tine $h$ and two outer tines $h'$—which project downwardly and forwardly from a transverse journal or top bar $h^2$. The latter is seated in the bearing-sleeves $g'$, which are arranged on opposite sides of the central tine and at such a distance apart that the middle tine projects forwardly through the space between the halves of the divided fork-bearing, in which space it can play freely. One of the bearing-sleeves is provided at its inner end and underneath the top bar of the fork with a forwardly-projecting stop $i$, on which the middle tine rests when the fork is in its working position and which prevents the fork from swinging farther rearwardly and downwardly. The middle tine is provided at a short distance below the journal or top bar $h^2$ with an eye $k$, which is formed by bending or twisting the tine.

L represents a spring-supporting rod, which extends upwardly from the eye $k$ of the fork and which is provided at its lower end with an eye $l$, by which it engages with the eye of the fork. M is a spiral spring, which surrounds this rod and bears at its lower end upon a washer $m$, applied to the rod above its eye, and at its upper end against a bracket N, which projects forwardly from the fork-arm and through which the upper end of the rod passes. This bracket is fitted with its half-round upright portion $n$ against the front side of the fork-arm and is secured to the latter by a clip or staple $n'$, which embraces the rear side of the fork-arm and passes with its legs through the upright part of the bracket, below the horizontal part thereof. The spring presses downwardly upon the fork and holds the latter against the stop $i$, but yields when the fork strikes an obstruction and allows the fork to swing upwardly and forwardly in clearing the same. The pressure of the spring can be regulated by adjusting the bracket up and down on the fork-arm. The pressure of the spring acting against the projecting part of the bracket at a distance from the fork-arm tends to tilt or bind the bracket on the fork-arm and so causes the bracket and the clip to hug the fork-arm closely. The spring is arranged on the front side of the fork-arm—that is to say, toward the front of the machine—and as the fork operates rearwardly in throwing the hay the spring stands behind the fork-arm in the direction in which the latter moves in throwing the hay and is protected by the fork-arm to a large extent against contact with the hay, whereby the liability of the spring becoming clogged is greatly reduced. The spring bears directly upon the fork below its pivot-line, and the spring-rod is consequently comparatively short and the arrangement of the parts very compact.

We claim as our invention—

1. A tedder-fork having its tines connected at the top by a journal-bar and having one of its tines bent below said journal-bar to form an eye, substantially as set forth.

2. A three-tine tedder-fork having its tines connected at the top by a journal-bar and having its middle tine bent below said journal-bar to form an eye, substantially as set forth.

3. The combination with the fork-arm, of a fork pivoted to the lower end thereof, having its tines projecting on the front side of the fork-arm and having one of the tines provided with an eye, and a righting-spring arranged on the front side of the fork-arm and bearing down on the eye of the fork, substantially as set forth.

4. The combination with the fork-arm, of a fork having a journal-bar from which the tines extend downwardly, and a divided fork-bearing which is secured to the lower end of the fork-arm and which is composed of two parts, each consisting of an upright clamping-plate, adapted to be secured to the side of the fork-arm, and a horizontal bearing-sleeve formed on the lower end of the clamping-plate, substantially as set forth.

5. The combination with the fork-arm, of a fork having a journal-bar from which the tines extend downwardly, and a fork-bearing which is secured to the lower end of the fork-arm and which has two bearing-sleeves, separated by a space through which the middle tine projects, and a stop on one of said sleeves below said tine for limiting the backward movement of the fork in the bearing, substantially as set forth.

6. The combination with the fork-arm, of a fork pivoted to the lower end thereof and extending forwardly therefrom, a righting-spring arranged on the front side of the fork-arm and connected at its lower end with the fork-arm below the pivot-line thereof, a forwardly-projecting bracket which supports the upper end of the spring and which is arranged against the front side of the fork-arm and capable of sliding on the same, and a binding clip or staple which embraces the rear side of the fork-arm and by which the bracket is adjustably held on the same, substantially as set forth.

7. The combination with the fork-arm, of a fork having its tines projecting on the front side thereof and connected at the top by a journal-bar by which the fork is pivoted to the lower end of the fork-arm and having one of its tines provided with an eye below said journal-bar, of a spring-supporting rod arranged on the front side of the fork-arm and having at its lower end an eye which is engaged with the eye of the fork, a spring applied to said rod, and a bracket which is secured to the fork-arm and which supports the upper end of the spring and guides the upper end of the spring-supporting rod, substantially as set forth.

Witness our hands this 6th day of April, 1899.

GEORGE ALBERT FARRALL.
EDWARD PRIDMORE.

Witnesses:
E. W. ATWATER,
M. J. EARLEY.